T. NOVERO.
BUOYANT MECHANICAL SUBMARINE MINE.
APPLICATION FILED JULY 12, 1907.
928,789.
Patented July 20, 1909.
7 SHEETS—SHEET 2.
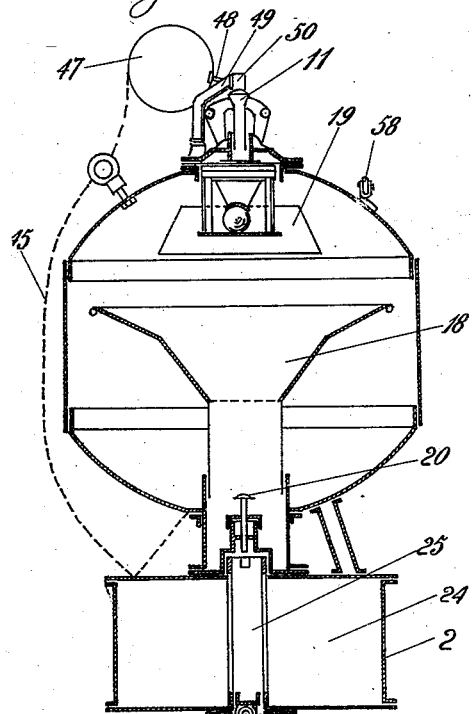
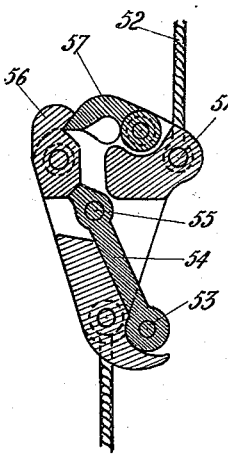
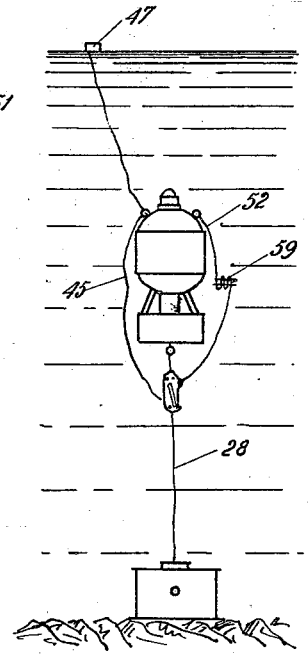
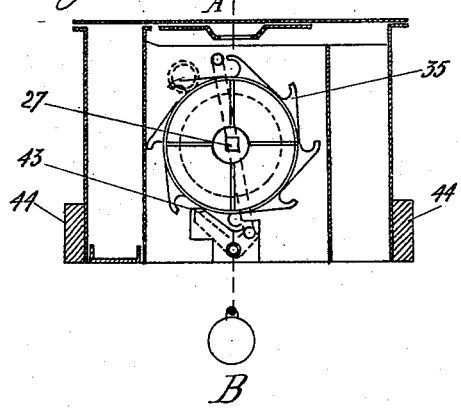
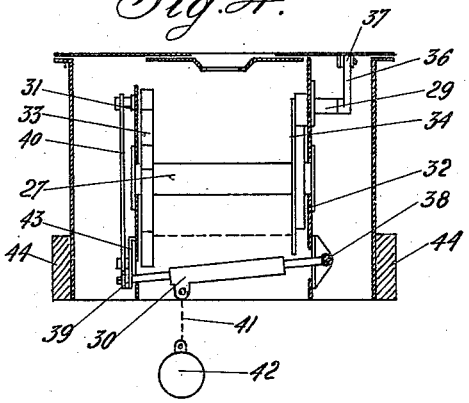

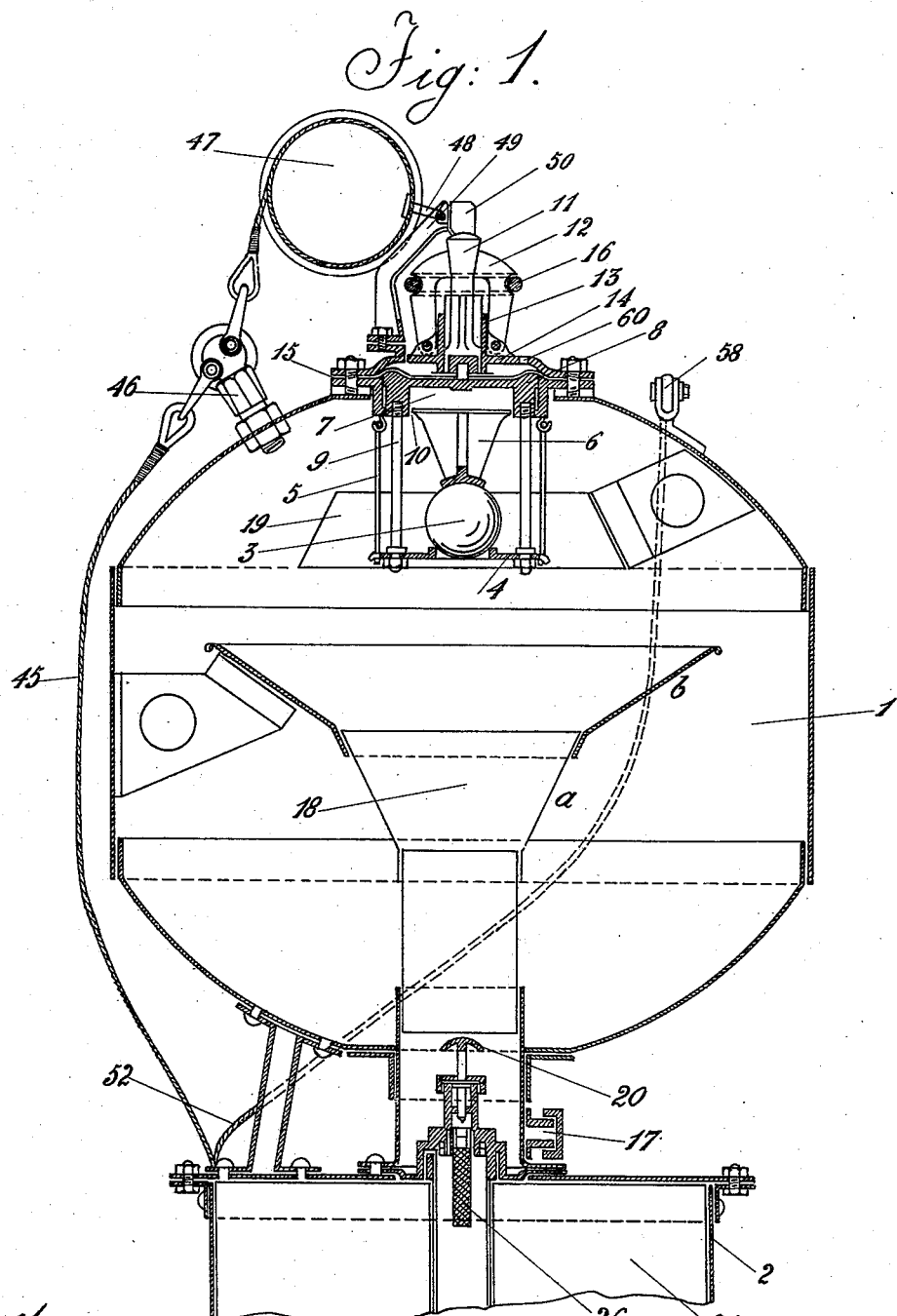

T. NOVERO.
BUOYANT MECHANICAL SUBMARINE MINE.
APPLICATION FILED JULY 12, 1907.

928,789.

Patented July 20, 1909.
7 SHEETS—SHEET 3.

T. NOVERO.
BUOYANT MECHANICAL SUBMARINE MINE.
APPLICATION FILED JULY 12, 1907.

928,789.

Patented July 20, 1909.
7 SHEETS—SHEET 5.

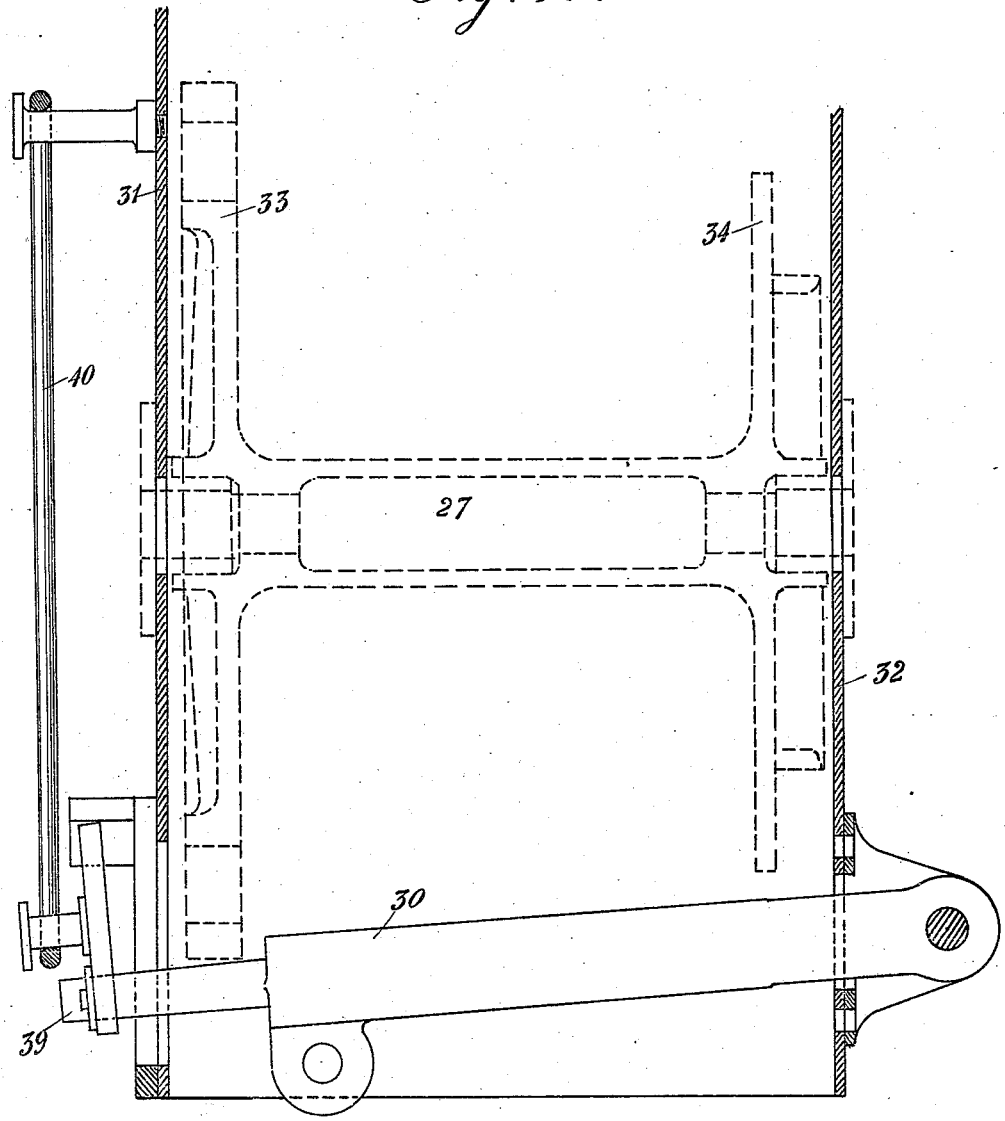

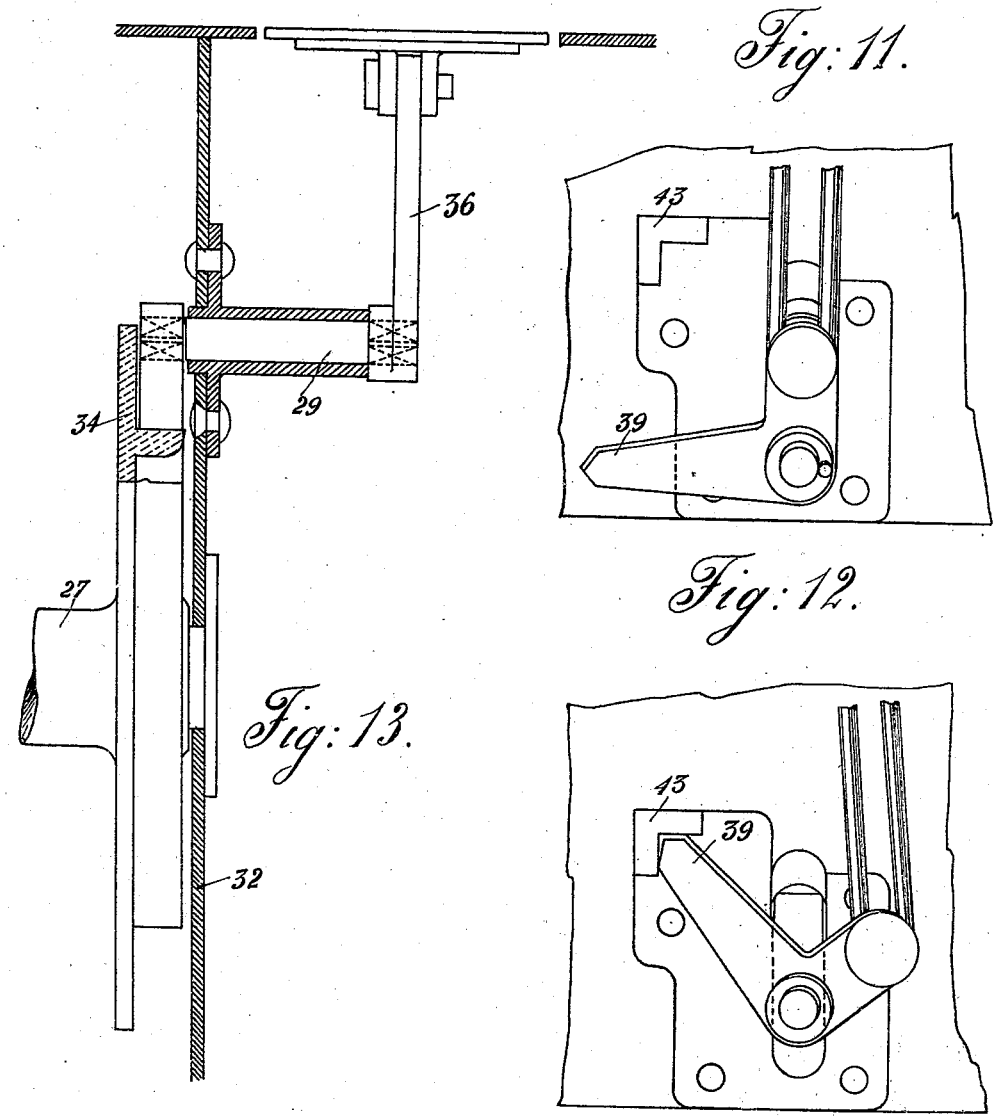

UNITED STATES PATENT OFFICE.

TITO NOVERO, OF SPEZIA, ITALY.

BUOYANT MECHANICAL SUBMARINE MINE.

No. 928,789.　　　Specification of Letters Patent.　　　Patented July 20, 1909.

Application filed July 12, 1907. Serial No. 383,511.

*To all whom it may concern:*

Be it known that I, TITO NOVERO, a subject of the Kingdom of Italy, residing at Spezia, in Italy, have invented a new Buoyant Mechanical Submarine Mine Which Can be Rendered Inoperative from a Distance and of which the following is a specification.

This invention relates to a buoyant mechanical submarine mine which can be rendered inoperative from a distance. It is a submarine weapon for the defense of harbors, channels, rivers, etc., as well as for blockade purposes, so as to prevent an enemy's ships from entering, escaping or passing generally.

The apparatus according to this invention consists of a mine proper and a mechanical anchor of special construction. The mine is intended to be suspended in the water, at generally about nine feet below the surface. It contains a charge of explosive substance which explodes when the mine is struck by a ship or other floating body. The anchor is a heavy body serving to retain the mine after having automatically brought it to the desired depth.

An apparatus according to this invention is illustrated by way of example in the accompanying drawings in which:—

Figure 7:
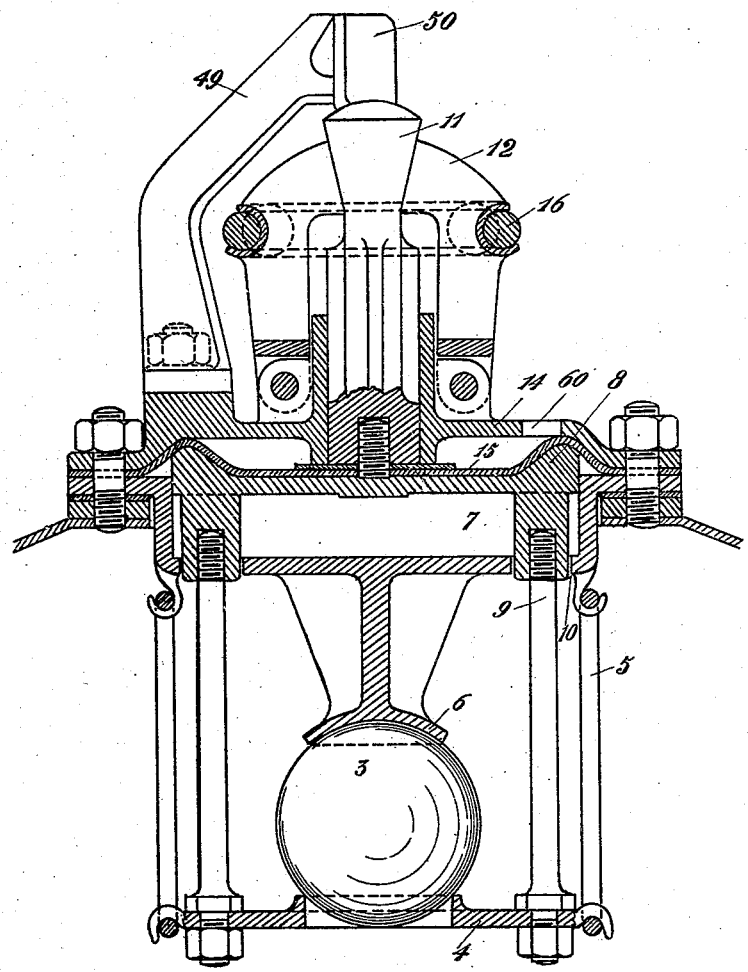
Figure 8:
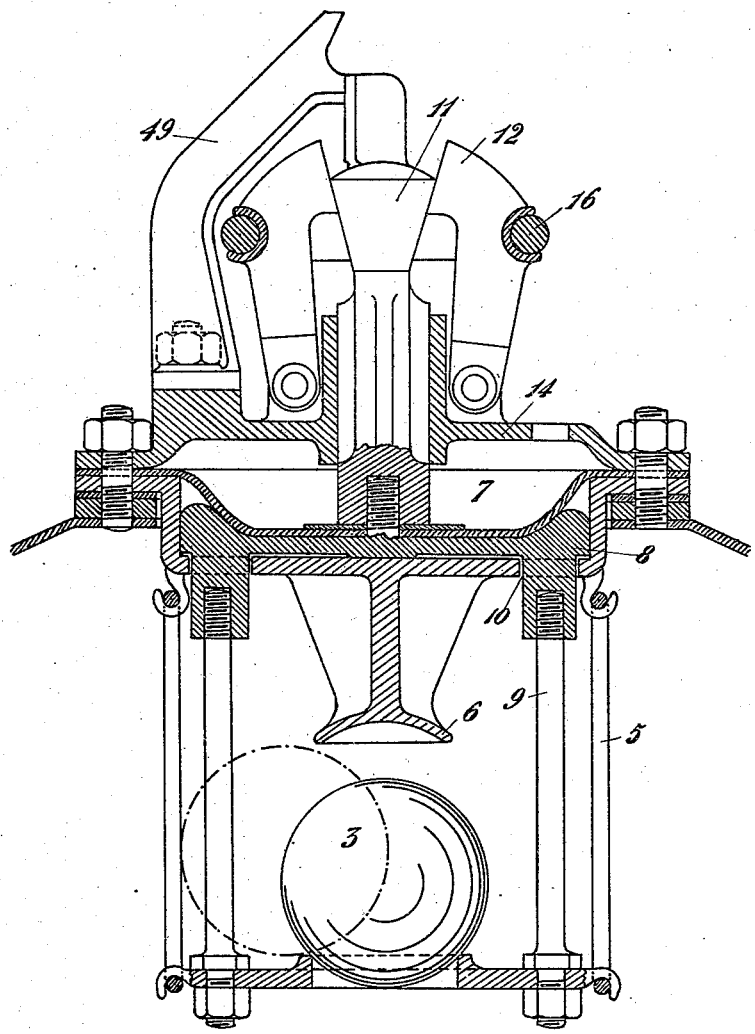
Figure 9:
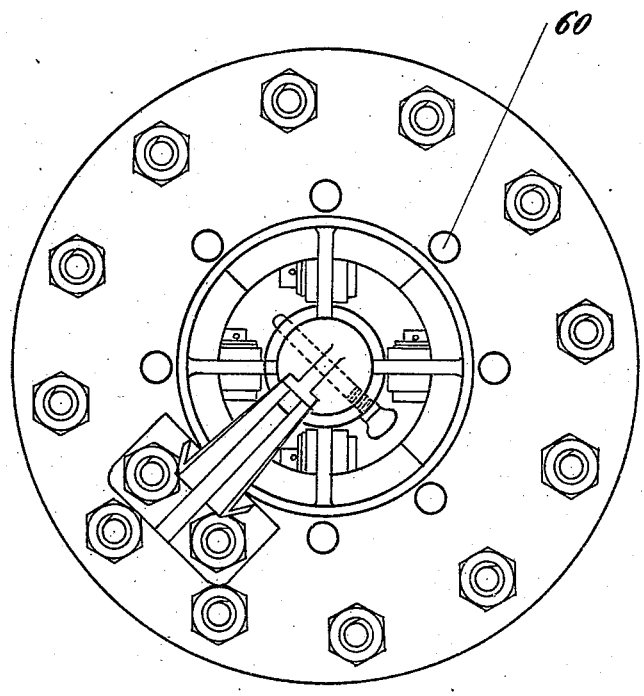

Figure 1 is the floating casing in vertical longitudinal section, showing the whole device which effects the ignition of the charge. Fig. 2 shows the mine proper in vertical longitudinal section. Fig. 3 is a section of the anchor. Fig. 4 is a sectional view on line A—B of Fig. 3. Fig. 5 is the mechanism for rendering the mine inoperative. Fig. 6 shows the whole apparatus in place. Figs. 7 and 8 are sectional views of the device which effects the ignition, the first in disarmed the latter in armed position, both in a larger scale. Fig. 9 is a top view of Fig. 7. Fig. 10 is the same as Fig. 4, in a larger scale. Figs. 11 and 12 are the stop mechanism in the anchor, the former in inactive, the latter in active position. Fig. 13 is the friction brake in sectional view and in a larger scale.

The mine proper is constituted by two metal casings made of cylindrical, spherical, conical or other suitable shape, securely connected together and rendered perfectly water-tight. The upper casing 1 is hollow and is intended to act as a float to maintain the mine at the required depth below the surface. The lower casing 2 is completely filled with the charge which may be gun cotton, ballistite, picric acid or other suitable explosive.

In all mines hitherto used, the charge has been placed in the float casing. Consequently, it explodes in a space larger than its volume, whereby, as is well known, the effect of the explosion is considerably reduced. In the mine according to this invention, the charge is on the contrary situated outside the float casing, and its explosion taking place in a space exactly equal to its volume the effect is much more powerful. This arrangement of the charge has also the advantage of allowing the volume of the float casing to be increased without affecting the action of the explosive charge, in waters with a greater current.

In the upper portion of the float casing is arranged the device which effects the ignition of the charge, and is of the type in which a ball or weight, mounted between a fixed and a movable support, is employed, and which upon displacement of the movable support can move and effect the discharge of the mine.

The improved device according to this invention consists chiefly of a sufficiently heavy solid metal body 3 supported by brackets 4 in such manner that it cannot fall except at the moment when the mine must act. In the construction shown in Fig. 1, the solid body 3 is a metal ball weighing from seven to thirteen and a half pounds; it rests on its brackets 4 and cannot fall until the axis of the mine becomes inclined to an angle of nearly 40°. If the inclination of the axis of the mine becomes greater than the said angle, the ball will fall, and this will generally happen whenever the mine is struck by a ship. The shock is transmitted to the bracket supporting the ball, whereupon the latter is thrown out. When the mine is to be rendered inoperative, the ball 3 is fixed between its brackets 4 and a projection 6 in the bottom of a box 7. A disk 8 slides vertically in the said box and is provided with two arms 9 passing through two holes 10 in the bottom, the brackets 4 being secured to the end of the said arms. Two elastic members or springs 5 hold the brackets 4 well pressed to the body 3. The number of arms 9 is immaterial as long as the ball 3 can pass between them and easily fall at the desired moment. The disk 8 is provided at the top with a conical rod 11 which is held between a system of four levers 12, pressed to them by an elastic ring 16. The lower part of the rod 11 slides in a tube 13 of the cover 14. The latter is connected to the box 7 and a rubber packing 15 inserted between them, so as to insure perfectly tight joint. It will be clear in this construction that, when the disk 8 is in its uppermost position, as shown in the drawing, the ball 3 is held tight, whereas if the disk, and with it the arms 9 is lowered, the ball will be released and be in a position to fall down on the mine being struck by a passing vessel. The elastic members 5 and 16 prevent the falling of the body 3 and with it they prevent the device from becoming operative before the mine has been placed in the water.

When the mine is in place, the pressure exercised on the packing 15, and consequently on the disk 8, by the water passing through some holes 60 (Fig. 9) of the plate or cover 14, which pressure is nearly equal to sixty-six pounds, will release the ring 16 and the elastic 5, and it will cause the disk 8 and with it the ball 3, to descend, so that the latter, being released from the part 6, can fall whenever the mine is struck. A branch, 17 serves to make sure by an air or water pump, of the perfect tightness of the float casing 1.

The whole device for effecting the ignition of the explosive constituted by the parts 3 to 16 could be screwed into the upper portion of the float casing 1, as shown in the construction in Fig. 1, or secured in any other way, by means of flanges, hinges, inclined planes, etc., provided that a perfectly tight joint is insured.

In the lower portion of the float casing 1, exactly under the ball 3, is arranged an inverted cone or chute 18 with a continuous surface or, if desired, with openings, for the purpose of making it lighter. The conical portion has two different inclinations, $a$, $b$, so arranged that when the mine becomes inclined to an angle of 38°, the body 3 falling upon the part 6 goes out of the cone 18. The neck of the cone 18 can be more or less long; or may be dispensed with altogether. A counter cone 19 prevents the body 3 from being thrown clear of the cone 18 when the apparatus is struck violently.

The bottom casing 2 contains the charge with all the accessories required for the explosion. It may be of any desired shape, provided that it have at the bottom a hole 21 through which the whole of the priming charge, detonator and percussion mechanism can be introduced. This hole must be then properly closed, this being shown in Fig. 2 as being effected by means of a metal plug 22 with an eye 23 for securing to it the chain of the anchor. The charge 24 weighs about a hundred and thirty pounds. The priming charge 25 which causes the charge 24 to explode is preferably made of dry gun cotton. The detonator 26 is preferably constituted by fulminate of mercury.

The percussion device 20, when the construction shown in Figs. 1 and 2 is used, which is the usual construction for exploding charges of gun cotton and ballistite, does not differ from those ordinarily used. Being sharply struck by the ball 3, it explodes the capsules containing an explosive mixture suitable for exploding the detonating charge 26, say fulminate of mercury, sulfid of antimony and chlorate of potash in suitable proportions. The detonator 26 explodes in its turn the priming charge 25 which causes the main charge 24 to explode.

If it be desired to use any other explosives, the force transmitted to the percussion device 20 by the fall of the ball 3, will be utilized in a suitable manner, the method of ignition being modified in accordance with the nature of the explosive. The mechanism of the percussion device or striker 20 can be of any desired construction, as long as it is capable of being operated by the fall of a weight such as 3.

The mine thus constructed is maintained at the desired depth in the water by means of an anchor of the well-known kind in which the cable is unwound from a drum suitably braked and mounted in the anchor casing, a pawl seld away from the drum by a weight and adapted to stop the rotation of the drum on the weight reaching the bottom of the sea, being provided. These anchors act automatically: It is sufficient to determine at what depth below the surface it is desired to anchor the mine and to throw into water the complete apparatus, that is to say, the mine and the anchor whereupon the whole apparatus will take up its proper position, the depth of the mine being determined by the length of the cord on the pawl actuating weight.

The anchor according to this invention is constructed as follows:—A drum 27 is provided with a cable 28 a friction brake 29 moderates the speed of rotation of this drum during the travel of the anchor to the bottom of the sea. A pawl 30 stops the rotation of the drum 27 when the anchor arrives at a distance from the bottom approximately equal to the depth at which it is desired to secure the mine. The drum 27 is supported by two plates 31 and 32 secured in the interior of the casing of the anchor, and is provided with two flanges 33 and 34 of which the flange 33 is provided with curved teeth 35 with which engages the pawl 30, while the second flange 34 has a circular rim on which the friction brake 29 acts. The teeth 35 of the flange 33 in Fig. 3 are shown curved, but they may be of different shapes, and their number may be greater or less than that shown. The friction brake 29 is operated by a lever 36 which, in its turn, is operated by a plate 37, on the lower surface of which the pressure of water acts during the lowering of the anchor. Owing to this, this brake 29 exercises an automatic action on the flange 34, that is to say, on the drum 27, and this action is in direct proportion to the speed of immersion of the anchor. The brake 29 can exercise its action either on the lateral face of the flange 34 or on its periphery. The plate 37 may be of any desired shape; it can have a continuous surface or be provided with one or more holes, the size of which could be adjustable by means of sliding plates.

The pawl 30 is a movable metallic bar pivoted about a pin 38 and controlled at its end 39 by an elastic 40, the strength of which can be regulated. To the center of the pawl bar 30 is secured a cable 41 with a weight 42 capable of neutralizing the action of the spring 40, so that when the cable 41 is stretched by its weight 42, the pawl is lowered and releases the drum 27, while when the weight 42, having touched the bottom of the sea, no longer stretches the cable 41, the pawl 30 is raised upward by its spring 40 and stops the rotation of the drum, and consequently, the unwinding of the cable 28. A stop 43 of any desired shape, holds the pawl 30 slightly open—but not to the end of its downward path—before the weight 42 becomes operative, this being done in order to insure that the unwinding of the cable 28 will begin immediately the anchor commences to descend. After the weight 42 has completely opened the pawl 30, the stop 43 is rendered permanently inoperative and does not in any way prevent the end 39 of the pawl 30 from engaging with the teeth 35 of the flange 33 under the action of the elastic 40. When the whole apparatus, including the mine and the anchor, is thrown into the water, the mine partially sinks and remains with its float casing 1 on the surface of the water. The anchor, on the contrary, the pawl 30 being open, sinks until it touches the bottom, being preceded by the weight 42 which stretches the cable 41 and renders the stop 43 inoperative (Fig. 11). At the moment when the weight 42 touches the bottom, its cable 41 ceases to be stretched, the pawl 30 is released and is moved upward by its elastic member 40, so that it engages with the teeth 35 of the flange 33 and stops the rotation of the drum 27, and the unwinding of the cable 28. But owing to its weight, the anchor continues to sink, and as the cable 28 no longer unwinds, it draws the mine with it. The latter will therefore sink to practically the extent of the travel of the anchor after the weight 42 has touched the bottom, that is to say, to a depth approximately equal to the length of the cable 41 of the pawl 30. In order to make the anchor sufficiently heavy to sink the mine and to keep it in place in spite of the action of currents and the waves, the casing is provided internally or outside with a metal ballast which, in Figs. 3 and 4, is indicated by the ring 44.

The mechanism for rendering the mine inoperative can be operated from a distance, which is a very great advantage. This mechanism is attached to the cable 28 at about half a yard from the casing containing the explosive charge. To a ring 53 is secured a cord 45 the other end of which is provided with a buoy 47. This buoy 47 is attached to the float casing 1 by a piece 48 inserted between a fixed arm 49 and a movable piece 50 which is a part of the rod 11. When the mine is in place, the rod 11 descends, the piece 48 becomes free and the buoy 47 ascends to the surface of the water. The cord 45 is attached by friction in 46 to the upper part of the float casing 1.

Another ring or hole 51 of the mechanism for rendering the mine inoperative, receives a cable 52, the other end of which is secured at 58 to the upper portion of the float casing 1. This cable 52 is about six feet long, and is folded two or three times at 59 (Fig. 6) for the purpose of shortening it. These folds are held by two rubber rings or two very fine strings. The buoy 47 shall be taken away from the piece 46 after this piece has been separated by traction from the float casing 1. The cable 45 is prolonged and it is plunged into the water. When it is desired to render the mine inoperative, the end of the string 45 must be found and strongly pulled to operate the lever 54 of the mechanism for the inactivity of the mine. This lever 54 turns about its axis 55 and releases the hook 56 which, in its turn will release the hook 57 and with it the cable 28. The mine being no longer held by the anchor, will be forced toward the surface of the water owing to its buoyancy, but on the way it will be held back by the cable 52 which will quickly turn it over so that it will remain floating with the charge upward. During this movement, the ball 3 will fall from its brackets 4, but it will have no time to strike the percussion device 20. In this inverted position the mine will no longer be dangerous, and can be easily rendered absolutely inoperative by removing the priming charge 25 and the detonator 26.

What I claim as my invention and desire to secure by Letters Patent is:—

1. In a submarine mine the combination of a casing, a tube connected externally thereto, a conical rod adapted to slide within said tube, a frame within the casing, means to suspend the frame elastically to the casing, a solid body loosely carried in said frame, a set of levers pivoted to the casing at points surrounding the said tube, an elastic ring to compress the free ends of said levers on to the rod and hold it so that it coöperates with the framework in holding the solid body in a fixed position.

2. In a submarine mine the combination of a casing, a tube connected externally thereto, a conical rod adapted to slide within said tube, a frame within the casing, means to suspend the frame elastically to the casing, a solid body loosely carried in said frame, a set of levers pivoted to the casing at points surrounding the said tube, an elastic ring to compress the free ends of said levers on to the rod and hold it so that it coöperates with the framework in holding the solid body in a fixed position, a funnel shaped receptacle within the casing to receive the solid body when it is released from the frame and an extension to said receptacle provided with sides sloped at a wider angle than the sides of the receptacle for the purpose set forth.

3. In a submarine mine the combination of a casing, a tube connected externally thereto, a conical rod adapted to slide within said tube, a frame within the casing, means to suspend the frame elastically to the casing, a solid body loosely carried in said frame, a set of levers pivoted to the casing at points surrounding the said tube, an elastic ring to compress the free ends of said levers on to the rod and hold it so that it coöperates with the framework in holding the solid body in a fixed position, and a guard shaped as a truncated cone to surround the frame and the solid body for the purpose set forth.

4. In a submarine mine the combination of a casing a tube connected externally thereto, a conical rod adapted to slide within said tube, a frame within the casing, means to suspend the frame elastically to the casing, a solid body loosely carried in said frame, a set of levers pivoted to the casing at points surrounding the said tube, an elastic ring to compress the free ends of said levers on to the rod and hold it so that it coöperates with the framework in holding the solid body in a fixed position, a funnel shaped receptacle within the casing to receive the solid body when it is released from the frame, an extension to said receptacle provided with sides sloped at a wider angle than the sides of the receptacle, a chute connected to the end of the said receptacle and a percussion device in said chute.

In testimony whereof I have signed my name to this specification in the presence of two subscribing witnesses.

TITO NOVERO.

Witnesses:
GIOVANNI MARATA,
GIOVANNI BATTISTO DUTER.